(No Model.)
E. P. USHER.
STORAGE BATTERY.
No. 509,268. Patented Nov. 21, 1893.
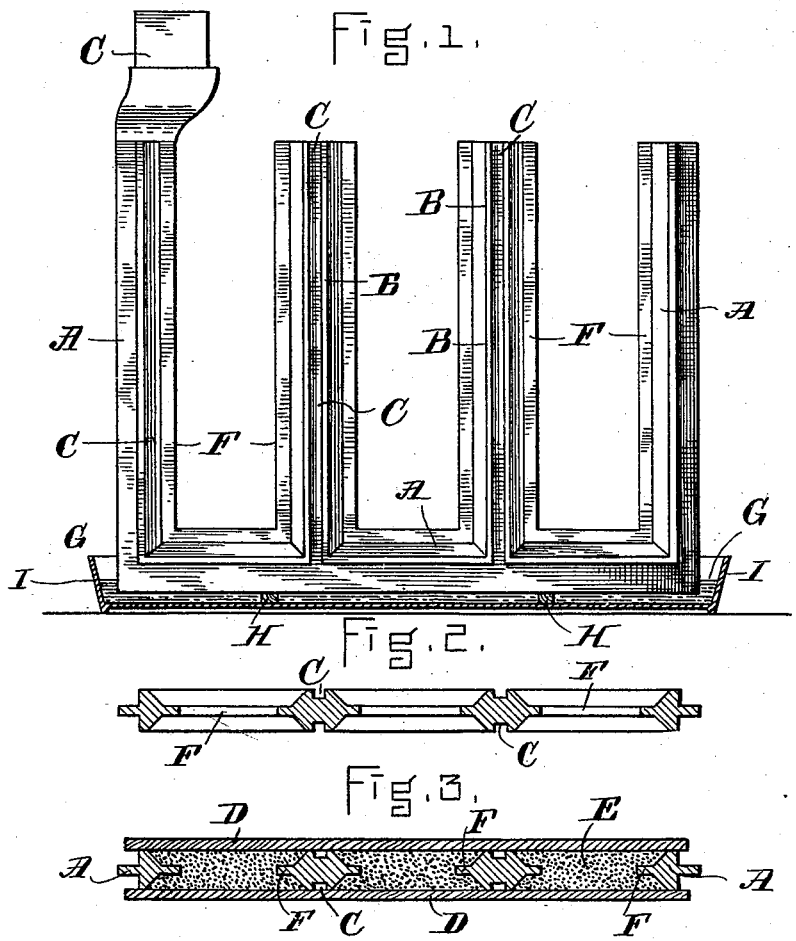
Witnesses.
R. Henry Marsh.
L. H. Bridge
Inventor.
Edward P. Usher
by A. H. Spencer
his attorney

UNITED STATES PATENT OFFICE.

EDWARD P. USHER, OF GRAFTON, MASSACHUSETTS, ASSIGNOR TO THE HOPE-DALE ELECTRIC COMPANY OF WEST VIRGINIA, OF WEST VIRGINIA.

STORAGE-BATTERY.

SPECIFICATION forming part of Letters Patent No. 509,268, dated November 21, 1893.

Application filed January 23, 1893. Serial No. 459,475. (No model.)

*To all whom it may concern:*

Be it known that I, EDWARD P. USHER, of Grafton, in the county of Worcester and State of Massachusetts, have invented certain new and useful Improvements in Storage-Batteries, of which the following, taken in connection with the accompanying drawings, is a specification.

This invention relates to the plates of storage batteries, and especially to the metallic frames of such plates, which are peculiar in mechanical construction and effect. These frames have upright bars or arms connected horizontally at one end, vertically grooved on their outer faces and formed on their edges with projecting fins or flanges and beveled edges in the plane midway between said faces. Thin wooden or other porous separators are placed in contact with each face of the frame, said grooves forming open vertical wells from top to bottom of the frame between the upright bar and the separator, and leaving space between the bars of each plate to receive the active material in powdered form, such material being controlled laterally by the separators and being penetrated by the fins or flanges on the edges of the upright bars. The several plates and separators are, at bottom, embedded in a shallow body of quick-hardening gum, and may rest upon wooden or other non-conducting supports holding the plates, out of contact with the pan. The vertical wells allow the liquid to rise and circulate. The edge-wise fins or flanges, projecting into the body of active material and preferably beveled, give it internal support when the plates are formed and in use.

In the drawings, Figure 1 is an elevation of one of my improved plate-frames, showing the uprights grooved, flanged and beveled, and showing at base, in vertical section, a pan with a gum setting or cement and wooden rests therein for the support of the plate. Fig. 2 is a horizontal section of said frame, and Fig. 3 a like section through the frame and separators, showing the filling of active material.

A represents the marginal frame of the plate, and B upright bars therein. These bars, and the vertical end-pieces of the frame, are widely grooved in their outer faces, from top to bottom, thus forming open vertical wells C for the free circulation of the acid.

D D are porous separators, preferably of kiln-dried wood through which the acid passes with sufficient freedom while the active material E, in powdered form, filled into the spaces between the bars or uprights A B, is prevented from passing through and hence short-circuiting is avoided. The separators lie in close contact with the grooved uprights, and form lateral retaining walls for the lead oxide E which is packed between them. Rubber bands or other fastenings may encircle each plate with its two separators, or the alternating plates may be packed in solid, with a single separator only between each one and the next.

The uprights A and B, as shown in Figs. 1, 2 and 3, are peculiar in having a central fin or flange F projecting into the spaces designed for the body of active material, and serving, when the plate is formed, to support this body of material which it penetrates edgewise. By preference the base of this fin or flange is beveled, as shown in the sectional views Figs. 2 and 3.

G represents a shallow body of cement or quick-hardening gum in which the lower edges of the several plates and separators are set, as indicated in Fig. 1. Wooden or other non-conducting rests H are shown in this gum body, interposed between the base of the plate and the bottom of the pan I, to support the plate free from contact with the body of the pan. The gum in which it is embedded is applied while hot to the assembled plates and separators, and when cold it holds them all firmly. A bottom layer of gum may first be allowed to harden. This will furnish a suitable insulation and support for the plates while the embedding layer is applied.

I claim as my invention—

1. In a battery plate, the frame having upright bars or arms vertically grooved in their outer faces and formed with edgewise fins or flanges extending into the space between said bars as described, in combination with non-conducting separators in contact with the opposite faces of said frame, and with a filling of material adapted to become active in the spaces between said upright bars, substantially as set forth.

2. In a storage battery, a series of plates and interposed separators set in a shallow body of cement or gum, the several plates being supported at a slight distance above the bottom of the vessel containing the gum, substantially as set forth.

In testimony whereof I have signed my name to this specification, in the presence of two subscribing witnesses, on this 21st day of January, A. D. 1893.

EDWARD P. USHER.

Witnesses:
A. H. SPENCER,
THOMAS J. KENNY.